Figure 1:
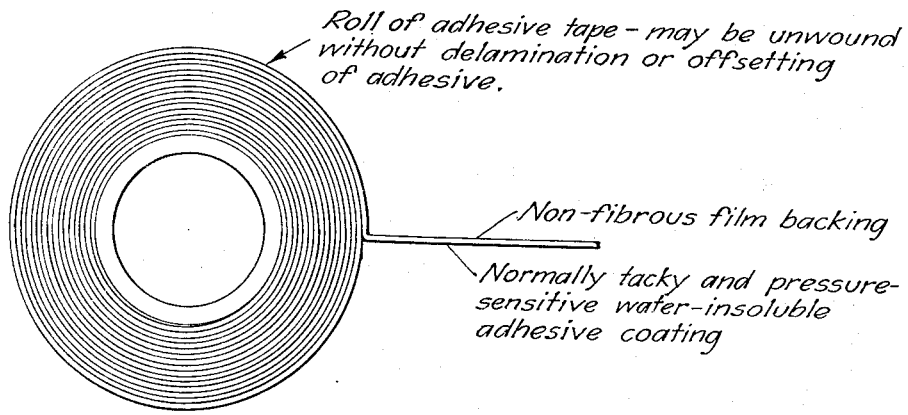

April 1, 1941.  R. G. DREW  2,236,567
ADHESIVE SHEETING
Filed Feb. 18, 1938

Inventor
Richard Gurley Drew
By Paul Carpenter
Attorney

Patented Apr. 1, 1941

2,236,567

UNITED STATES PATENT OFFICE 2,236,567

ADHESIVE SHEETING

Richard Gurley Drew, St. Paul, Minn., assignor to Minnesota Mining & Manufacturing Company, St. Paul, Minn., a corporation of Delaware Application February 18, 1938, Serial No. 191,260

8 Claims. (Cl. 91—68)

This invention relates to adhesive sheets having a backing with a non-fibrous surface (such as normal or waterproofed films of regenerated cellulose) and a coating of normally tacky and pressure-sensitive adhesive united thereto. While not limited thereto, the invention relates especially to transparent adhesive sheets, to adhesive sheets in the form of adhesive tapes which may be sold in stacked or coiled form, and to adhesive sheets or tapes which are well adapted to the sealing or securing of wrappers composed of non-fibrous lustrous cellulosic films and the like.

This application is in part a continuation of my co-pending application Ser. No. 675,291, filed June 10, 1933, and is in part a continuation of my co-pending application Ser. No. 534,386, filed May 1, 1931.

The development of packaging and wrapping sheets composed of thin, transparent and flexible non-fibrous films has raised special problems as to sealing or fastening with adhesives. Likewise, the desirability of using such films as backings for adhesive tapes cannot be met by use of the old conventional adhesives. Such sheet material is exemplified by gelatinized cellulosic materials which form films, such as regenerated cellulose, cellulose esters (as cellulose nitrate and cellulose acetate), and cellulose ethers (as ethyl cellulose), and by regenerated cellulose films which have been waterproofed by coating on one or both sides with a layer or film of a cellulose derivative. The popularity of these materials resides in such qualities as brilliancy, sheen and transparency, and in the later development of such material, in the quality of waterproofness. Ordinary glue type adhesives are insufficiently adherent by reason of the highly glazed surfaces provided by this type of sheet material.

In accordance with this invention, sheets of such film material are provided with water-insoluble coatings of normally tacky and pressure-sensitive adhesive firmly united thereto. By "normally tacky and pressure-sensitive" it is meant that under ordinary atmospheric conditions the adhesive is stably in a condition such that it does not need to be activated by solvents or heat or otherwise prepared in order to secure good adherence to surfaces against which the adhesive coating (with its backing) may be pressed when used. An adhesive coating is provided which enables the adhesive sheeting to be affixed to smooth lustrous surfaces, such as non-fibrous cellulosic surfaces of wrapping or packaging sheets or films. An object of the invention is to provide a unified adhesive coating possessed of such coherence in relation to adhesiveness and so firmly united to its backing that the adhesive sheet may be stripped from smooth non-fibrous surfaces (not possessing special chemical affinity for the adhesive), to which it may have been temporarily applied, without offsetting of adhesive material. Hence the adhesive coating may be termed "non-offsetting," and this expression designates an important physical or physico-chemical property or characteristic of the adhesive coating, namely, that its coherency is greater than its adhesiveness. Further, an object is to provide adhesive sheets having an adhesive coating that is in elastic equilibrium with its backing so that warping and curling of the sheet, and blistering of the adhesive coating, are avoided.

Figure 2:
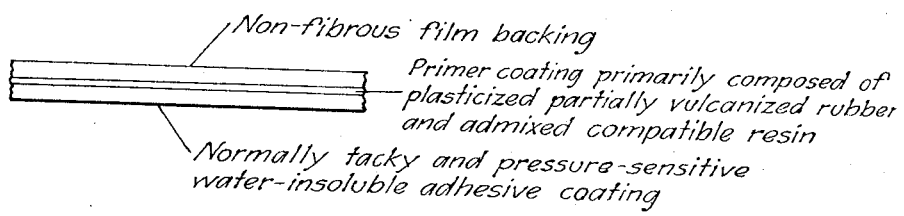

Figure 1 shows a roll of adhesive tape having a non-fibrous film backing provided with a water-insoluble normally tacky and pressure-sensitive adhesive coating, which may be unwound without delamination or offsetting of adhesive; and Figure 2 is a diagrammatic magnified edge view of the tape of Figure 1, showing a primer coating interposed between the adhesive and backing, primarily composed of plasticized partially vulcanized rubber blended with compatible solid resin.

Adhesive sheets are provided in which all components and the composite are transparent, so that the sheets may be applied without concealing the coloring or markings of the surfaces to which applied.

The transparent backing may be printed in reverse, on the face which carries the adhesive and prior to coating, to provide an adhesive sheet with the printing visible through and protected by the backing.

The adhesive sheets may be prepared with a surface continuously coated with adhesive, as in the case of ordinary adhesive tapes, labels and seals, or with the adhesive on certain areas only, as in the case of a packaging sheet provided with coated portions to permit sealing without the use of other sealing means.

It is preferred that the backing to which the adhesive coating is united be a transparent, flexible, non-fibrous film of gelatinized cellulosic material, such as regenerated cellulose (as normal or unwaterproofed "Celophane"), cellulose esters (as cellulose nitrate and cellulose acetate), cellulose ethers (as ethyl cellulose), or composites of such materials as, for example, a film of regenerated cellulose coated on one or both surfaces with a waterproofing film of a cellulose derivative (as a cellulose ester or ether). However, I may utilize backings comprised of materials other than gelatinized cellulosic materials, and which are either non-fibrous or are coated with non-fibrous films (preferably waterproof) composed of cellulosic or other suitable material, including varnishes, lacquers, etc.

In its preferred form, my invention is particularly applicable to transparent films of gelatinized cellulosic materials, such as regenerated cellulose, which is clear, transparent and lustrous. This may be made by forming an alkali cellulose compound, properly aged, of wood pulp or cotton liners, then xanthating to prepare viscose with carbon bisulfide and after careful filtration and clarifying by removing air or solid particles, casting the viscose in a coagulating bath of sulfuric acid and sodium sulfate. The film so cast is desulfurized, bleached, softened with glycerine, and then dried.

The product so made, though desirable for a great many purposes, has a tendency to be hygroscopic. It is preferred, therefore, to waterproof the film so produced, either on one side or on both sides, with a thin film of nitrocellulose, cellulose acetate, cellulose ether, and similar cellulosic compounds. It will be understood that the waterproofing ingredients may include oxidized oils, varnishes and lacquers. The primary requisite is in the application of these waterproofing films so as not to impair the lustrous and transparent characteristics of the sheet formed and to overcome any tendency to provide a warped sheet by the waterproofing layer that may be applied. Additionally, coatings such as transparent rubber, synthetic resins, and like materials, may be used as a waterproof coating.

Where transparency of the adhesive tape is not of major importance, but where it is desired to provide a flat, unwarped exposed brilliant and lustrous surface, I have determined that an adhesive coating may be applied to the cellulosic film of the character previously enumerated and obtain a composite in which the adhesive is unified thereto, and in elastic equilibrium with the film, by using a composition made as follows:

EXAMPLE A

A rubber compound and a tackiness augmenting agent in the form of a synthetic resin are used. Proportions suitable for ordinary temperate climates may comprise:

|  | Pounds |
| --- | --- |
| Plasticized, first quality plantation rubber, such as clear crepe or smoked sheets | 10 |
| Cumarone gum or resin | 2 |
| Zinc oxide pigment | ½ |

The cumarone gum or resin is an artificial resinous material coming under the group name of cumarone and indene resins, which is the polymerization product of coal tar derivatives. The above ingredients are compounded on a rubber rolling mill to a plastic condition and then cut to desired body or consistency, using a rubber solvent such as benzol or a petroleum solvent, such as high test gasoline. In lieu of a synthetic resin, I may employ a low melting point natural resin, e. g., Burgundy pitch or pine oil foots. Burgundy pitch is soluble in both alcohol and benzol.

EXAMPLE B

|  | Pounds |
| --- | --- |
| Plantation rubber | 2 |
| Mexican or wild rubber, high in natural resin content | 5 |
| Zinc oxide pigment | 1 |

The ingredients above enumerated are compounded on a rubber mixing roll and then cut to the desired consistency in a rubber solvent, based upon the necessary viscosity for spreading this material.

It will be understood that the examples above given are for the purposes of getting the requisite adhesiveness in temperate climates. An increase in resinous material or wild rubber may be made for material to be used in colder climates, and in warmer climates the resin component may be reduced.

The resinous component may also be varied in its characteristics in its reactions to solvents by choice of the resinous material. Thus, for purposes of removal of the adhesive tape from some body to which it may be applied, the adhesive may be made so as to have a resin constituent which is soluble in a desired organic solvent, such as benzol, gasoline, acetone or alcohol. Thus, where it is desirable to make a surgeon's tape which is rendered removable by the application of alcohol, an alcohol soluble resin is added in the examples above cited. Such resin may be Burgundy pitch. This will permit alcohol to be used in removing a piece of adhesive tape from any surface, such as from the skin of a patient, by merely applying alcohol to the adhesive.

The rubber resin compounds in their solvents may be spread upon the backing directly, utilizing a knife spreader to uniformly and equally distribute this material upon the backing. The solvent may thereafter be removed by evaporation, preferably recovering the solvent by some suitable recovery method, leaving the rubber mixture upon the gelatinized cellulosic backing material. The coating so applied is firmly adherent and unified to the backing material and provides a normally tacky and pressure-sensitive adhesive coating of a unified character, without in any way curling or warping the transparent gelatinized cellulosic film.

Where it is desired to obtain a clear composite of backing material and adhesive, the adhesive preferred by me for this purpose may be made as follows:

EXAMPLE C

|  | Parts |
| --- | --- |
| Rubber (double break down latex crepe) | 200 |
| Para cumarone resin | 85 |
| Wood rosin | 10 |
| Liquid paraffin oil | 5 |

(All parts are by weight.)

As a variation from the above, where lack of transparency is not objectionable and the addition of a colored hue to the composite of backing and adhesive material desirable, the formula may be varied as follows:

EXAMPLE D

|  | Parts |
| --- | --- |
| Rubber (latex crepe) | 250 |
| Zinc oxide | 225 |
| Pine green light colored pigment | 25 |
| Wood rosin | 137 |
| Liquid paraffin oil | 30 |

This type of adhesive is normally tacky and pressure-sensitive and has a greenish opacity. It will be understood that where a different color is desired to be imparted to the transparent film backing material, the pigmenting material may be correspondingly varied. Coloration in the adhesive may be used to neutralize or vary objectionable shades or colors in the transparent backing material.

If desirable, dyes may be used particularly to preserve the transparency and attractive sheen of the composite, or the color (pigment or dye), may be added to the backing material itself. In either method of addition, where dyes are desirable and particularly for a clear blue transparency, indamine blue is suggested as of value for this purpose; pigmenting may be accomplished by such material as Prussian blue.

The zinc oxide filler, when used, serves as a reinforcing pigment imparting greater coherency and firmness to the adhesive coating. Colored pigments likewise function as reinforcing pigments and thus have a function in addition to that of coloring the adhesive.

In the examples C and D given above, paraffin oil has been included for purposes of plasticizing the rubber. I have found that in order to obtain maximum transparency and the highest possible bond strength and firmness of the adhesive inter se, the paraffin oil may be omitted.

Such adhesive coating, particularly valuable for this purpose, is as follows:

EXAMPLE E

|  | Parts |
|---|---|
| Rosin | 160 to 200 |
| Thin latex crepe rubber | 250 |
| Beta naphthol | 2.5 |

Approximately 3248 parts of benzol may be added to the above ingredients to provide a readily spreadable cement, and the ingredients may be incorporated in the benzol without the necessity for milling.

In the example given, beta naphthol has been specified and this is primarily used as an antioxidant. This material is desirable in the above formula, as well as in the other formulae given under A, B and C, in that the adhesives are given longer life.

Other antioxidants are desirable and may be included wherever rubber is used in the adhesive. Such antioxidants which may be used are as follows:

(1) Aldol-alpha-naphthylamine
(2) Phenyl-beta-naphthylamine
(3) Symmetrical- di-beta - naphyl - para-di-phenylene-diamine In the examples as above given, the proportions are by weight, and variation may be made in the primary materials, as well as the quantity of the ingredients. Thus, in the examples given under C, D and E, latex crepe, the rubber component, may be varied by substitution in part or in whole by smoked sheet rubber. Though the synthetic resins, such as cumarone resins above referred to, are preferred, various blends of other synthetic resins may be utilized, in part or in whole. To a certain extent, the wood rosin may be substituted by various grades of gum rosin.

In making the adhesives, the rubber base and the resin base determine the tackiness exhibited by the finished product. This relationship, also coupled to a certain extent with the treatment given to the rubber, determines this factor.

In producing a clear adhesive, the relationship of plasticizer (above listed in the form of liquid paraffin oil) and resinous material may be considered as constituting the tack-producing phase of the adhesive, and, up to a certain point, the greater the quantity of the tack-producing phase that is added to the rubber, the greater the tackiness exhibited in the rubber base adhesive.

In general, for every two parts of rubber base, by weight, one part, by weight, of the tack-producing phase may be added. As indicated above, the resinous content may be varied to increase or decrease the tackiness. However, in order to provide a unified adhesive, satisfactory for purposes of unwinding of the tape from rolls, the resinous content must be retained within certain limits beyond which the adhesive is likely to offset at normal atmospheric temperatures.

In the formulae above cited, double break down latex crepe rubber has been referred to and the treatment of this product alone, as well as the addition of the tack producing phase therewith, will control the characteristics of the adhesive layer. Thus double break down latex crepe, as contemplated by me above, results from milling latex crepe rubber for approximately fifteen minutes to plasticize the same, with or without heat, and after aging for twenty-four hours, is again plasticized in a mill. At this stage, the material is suitable for addition to the material constituting the tack-producing phase. This may be accomplished as follows:

*Method A.*—200 parts of rubber (double break down latex crepe from the rubber mill as above described) are placed in an internal mixer where the para cumarone resin, wood rosin and paraffin oil (where this is used) are gradually added during the mixing operation to thoroughly incorporate the same into the rubber. No solvent need be used if the mixer is powerful enough to knead the resinous materials into the rubber. When this dry mixing has been thoroughly accomplished, a rubber solvent, such as a heptane or benzol, is introduced while the internal mixer is maintained in operation. This action is continued until complete solution results. The quantity of solvent added is in accordance with the means to be employed for spreading this material upon the backing material.

*Method B.*—200 parts of rubber (preferably double break down latex crepe as above made) are placed in a stirring equipment where paddles agitate the solvent and other ingredients into solution. When 200 parts of rubber have been placed into this mixer, the agitating member is started and a quantity of rubber solvent, such as heptane or benzol, is added to dissolve the rubber. The resinous materials in this particular example, para cumarone resin, wood rosin and the liquid paraffin oil (where this is used), are dissolved in a separate mixer, using an additional quantity of solvent, for example, heptane or benzol. When these parts are uniformly distributed and in solution, the parts from each mixer are combined. The quantity of benzol is calculated in accordance with the method which may be used for spreading it upon the backing material. The solvent is evaporated after coating or spreading of the adhesive upon the backing material.

In use, the adhesive, as above described, may be directly applied to the backing or sheets of transparent gelatinized cellulosic materials, previously enumerated, and forms a desirable product.

Where considerable unification is desired between the adhesive layer and the backing material, to assure proper anchorage of the adhesive layer with the backing material, thereby assuring satisfactory unwinding or separation when the composite is formed into rolls or stacks, it is preferred to first coat the sheet of gelatinized cellulosic material with a priming composition. Priming on one surface is particularly effective with sheets formed of regenerated cellulose. The priming operation consists of first coating the backing material before application of the adhesive materials previously described.

The priming composition, as preferred by me, is a solution of a rubber resin mixture in an organic solvent in which the solid materials may be varied from 15 to 50% with 85 to 50% of the solvents used. Preferably the solids constitute about 17% of the solution so prepared.

Primer No. 1

A preferred composition comprises:

| | Parts |
|---|---|
| Rubber (latex crepe) | 2 |
| Resin (such as pine pitch or wood rosin) | 4 |
| A filler, such as whiting, (optional) | 1 |

These two or three ingredients, as listed, constitute the solid components in the priming mixture above enumerated.

It is preferred that the deposition product resulting from coating with the priming composition be one whose solid components retard the solvent action of the overlying material when coated thereon as a solution. That is, the solids, which may be contained and are present in the primer composition, are of such nature that after deposition they are difficultly soluble (only slowly dissolved) in the solvent used for plasticizing and coating the adhesive layer. In the example above given, such properties may be imparted to the deposition product by utilizing rubber which has been partially vulcanized, plasticizing in a mixing device such as an internal mixer in the presence of heat, sufficient to render the mass sticky and to cause the ultimate primer coating to have a strong bonding action. As an additional operation, a solvent retardent may be added. Though whiting is illustrated, other fillers may be used, such as zinc oxide, which serves as a reinforcing pigment to give greater coherency and firmness, in addition to any solvent retarding action which they may have.

Though it is indicated that high grade vulcanized rubber, plasticized to tackiness, may be utilized with some degree of success in the example above cited and identified as Primer No. 1, it is preferred, particularly where transparency is desired, to use the combination of ingredients above identified, and to merely add during the mixing operation the requisite quantity of sulphur and accelerators. The quantity of these ingredients, if any, is merely sufficient to render the rubber component difficultly soluble in the solvent present in the solution of the adhesive composition, so made for spreading purposes, without reducing the quality of this priming coat to unify with the adhesive layer superimposed thereover.

Primer No. 2

Rubber, in the form commonly referred to as latex crepe, with the resin content in the proportions above indicated, has added thereto sulfur and accelerators. These are vulcanized with heat after intimate admixture and, while in the softened condition, are mechanically milled until a sticky mass, soluble in benzol or naphtha, is obtained. The amount of benzol or naphtha added is to obtain the requisite fluidity, and these solvents may be added to the solid components in quantities of from 50 to 85% as compared with the rubber and resin content.

The primers above described under 1 and 2 may be further rendered resistant to the solvent action of the overlying adhesive to be applied in a subsequent step, by the use of "Vulcoloc" as a superimposed priming composition. This material is, to the best of my knowledge, a reaction product of rubber and a sulfur bearing acid. Vulcoloc may be applied directly to the backing material prior to the application of the solution of adhesive material. Application of an organic solution of the adhesive does not affect the coating of the Vulcoloc primer as applied.

A material which is suitable as a substitute for rubber in the primer, is an artificial or synthetic rubber known as "Duprene" ("Neoprene") which is a polymerized diolefine compound.

Additional examples of transparent primers which anchor the adhesive coating to regenerated cellulose such as Cellophane, whether waterproofed or untreated (ordinary), and to films of cellulose derivatives (such as cellulose acetate, cellulose nitrate and ethyl cellulose) etc., are as follows:

Primer No. 3

| | Parts |
|---|---|
| Selected tube reclaim rubber | 90 |
| Latex crepe rubber | 10 |
| Whiting | 40 |
| FF wood rosin | 140 |

Primer No. 4

| | Parts |
|---|---|
| Selected inner tube reclaimed rubber treated further to remove pigment | 90 |
| Latex crepe rubber | 10 |
| FF wood rosin | 140 |

In the above example, still better results will be obtained by using, in place of FF wood rosin, a heat-treated wood rosin known as "Solros" wood rosin.

The reclaim rubber and latex (and whiting or other reinforcing pigment when used) are compounded together on the ordinary type of rubber mill and milled for 30–40 minutes. This milled base is then transferred to a heavy duty internal mixer (such as a Baker Perkins Mogul type mixer) and milled for 1–2 hours with 10–20 lbs. steam pressure in the heating jacket. The rosin is then added and mixing is continued for another hour. The jacket steam is then turned off and the mass cooled. The requisite amount of solvent (heptane or benzol for example) is then added, preferably in amount equal to 4–5 parts by weight per part of reclaim rubber. Mixing is continued, generally for about one-half hour, until the whole mass is homogeneous. The resulting primer composition or solution is then ready for application to the backing.

In this method of compounding, the reclaim rubber becomes plasticized by the mechanical working in the presence of heat and air, and is further plasticized by the rosin which is thoroughly incorporated with the rubber.

The reclaim rubber is superior to raw rubber, for use in the primer, for several reasons, including: The primer coating is rendered difficultly soluble in the rubber solvent contained in the subsequently applied adhesive solution, because the reclaim rubber is in a partially vulcanized state which greatly decreases the rate of solution in rubber solvents. The primer coating has a greater bonding action, i. e., becomes more firmly unified to the backing and to the adhesive coating, due to the higher adhesion value of the reclaim rubber resulting from the heating cycle and amount of break down experienced in the reclaiming process. These features are obtained without sacrifice of firmness or coherency of the primer coating, due to the high cohesivness of the reclaim rubber resulting from its prior vulcanization. If raw rubber were subjected to the same treatment, it would have softness and stickiness but would lack adequate cohesivness. The reclaim rubber above referred to in the formulae for making the primers is preferably made as follows:

Light colored inner tube stock may be utilized, though other forms of vulcanized rubber may be used. Where inner tube stock is used, it is chopped up on mill rolls, preferably of the type utilizing breaker members, simulating heavy gear teeth. Rolls of this character operate in pairs, the top one being free to move up and down, while the lower one is stationary. Relative rotation of these rolls serves to chop up the scrap. After the scrap is chopped and torn apart, it is fed to the breakers, which pulverize it further, whereupon it is then passed over a screen and the fine particles separated out. The coarse particles are recirculated through the breakers until they also go through the screen. The fine particles are then charged into horizontal digestors, where they are treated with caustic soda solution, the heating of the stock being carried out under a steam pressure of about 40 pounds while being agitated. This treatment is carried out from 8 to 24 hours, to remove all fibres and free sulfur, and to plasticize the rubber. After digestion as above described, the stock is washed with water until practically free from caustic. The stock is then charged into a continuous belt drying system, where it is dried at a rather low temperature. The stock is then ready for the mill room, where the first operation is to mass these small particles together on a large mill. After consolidation on the large mill, the rubber is then run through refiners, which cause grinding and crushing of any hard particles in the stock. The product is then passed through a strainer in which the rubber is extruded through heavy mill screens into small rod-like forms, after which they are massed together into sheets or slabs.

In some cases the procedure above described may be slightly varied, for example, when certain types of inner tube reclaim are desired, the pulverized scrap is heated in the presence of steam alone, without any caustic. It is thereupon, after being heated, sent directly to the mill room, without any further treatment.

The method of application of the coating materials above described will, to a large extent, depend upon the character of the coating. The primer and adhesive coatings may be successively applied, where these are used in solutions of volatile solvents, by an offset process from rollers uniformly coated with the primer compositions or the adhesive composition. With the more viscous composition of either primer or adhesive, these papers may be coated upon the backing by a knife spreader. For the more plastic form of either composition and where unification is desired, calendering or frictioning of these materials may be resorted to, to apply either the priming coat, or the adhesive coat, or both.

As an example of one method which may be followed in preparing the composite, the following procedure is recommended. A web of regenerated cellulose film of the desired thickness (which may have been printed on the face receiving the primer) is carried through a set of vertically positioned squeeze rolls. The lower roll has transferred to it, or dips into, the solution of the primer composition. A uniform layer of primer is applied at this point to the film or web of backing material. The web thus prepared travels from the squeeze rolls, to a duct for removing and drying off the solvents in the primer. The web then is directed to a contrivance for coating, at which point a doctor knife or coating knife is used to spread a film of the composition of adhesive material. The composition is directly applied over the primer, and the composite, as coated, is either hung in festoons or travels through a drying duct, at which point sufficient time is allowed for complete removal of the solvent, and to form the deposition product to the desired consistency, due to the solid components present, for tackiness. If heat has been utilized to separate the solvent from the deposition product resulting in the adhesive, the composite thus formed may be cooled and brought to room temperature, to render the product in more convenient form for stacking or winding into rolls. Where wound into rolls, the composite thus formed is then cut or converted into small rolls, suitable for trade requirements.

The adhesive composition, as deposited upon the film as heretofore described, is one which is normally tacky and pressure-sensitive. This type is water-insoluble and provides a waterproofing of the underlying base. It is of particular utility in connection with the lustrous, highly polished backing material described, in that the adhesive layer is in equilibrium with it and will not alter or warp its appearance. As indicated, the adhesive layer is unified, in that it has great adhesion inter se (coherence) and when applied forms a unified product with the backing material. When wound into rolls or formed into stacks, the lustrous surface of the backing will not be modified, no offsetting will occur, and ready separation is assured of the entire composite from its adjacent layer.

Where the product may encounter low humidities or low temperatures, it may be desirable to coat the back side of the backing material with a protective coating, such as a thin film of glycerine. In such event, a protective coating is applied which is not disintegrated by, or which does not interfere with, the adhesive action of the adhesive layer. It will be understood, however, that under ordinary conditions, the composite of backing material and adhesive layer, as hereinbefore described, is a complete unified product and no further treatment need be made.

Attention is called to my Patent No. 2,177,627, issued October 31, 1939, upon a companion application filed of even date herewith.

What I claim is as follows:

1. A pressure-sensitive adhesive sheet comprising a flexible backing having a non-fibrous filmed surface, a coating thereupon of a water-insoluble non-offsetting normally tacky and pressure-sensitive adhesive, and a highly cohesive interposed flexible primer coating primarily composed of plasticized partially vulcanized rubber blended with an admixed compatible solid resin predominating the rubber and adapted to plasticize the rubber and increase its bonding strength, the adhesive coating being bonded to the backing surface more firmly than if said primer were omitted and said adhesive sheet being removable from smooth surfaces to which temporarily applied without delamination or offsetting of adhesive.

2. An adhesive sheet comprising a flexible backing having a smooth non-fibrous surface, a coating thereupon of a water-insoluble non-offsetting normally tacky and pressure-sensitive adhesive, and a highly cohesive interposed flexible primer coating primarily composed of masticated reclaim rubber blended with an admixed compatible solid resin predominating the reclaim rubber and adapted to plasticize the reclaim rubber and increase its bonding strength, the adhesive coating being bonded to the backing more firmly than if said primer were omitted and said adhesive sheet being removable from smooth surfaces to which temporarily applied without delamination or offsetting of adhesive.

3. A pressure-sensitive adhesive sheet comprising a flexible backing having a non-porous surface, a coating thereupon of a water-insoluble non-offsetting normally tacky and pressure-sensitive rubber-resin type adhesive, and a highly cohesive interposed flexible primer coating primarily composed of reclaim rubber plasticized by mechanical working in the presence of air and heat and blended with rosin predominating the rubber, the adhesive coating being bonded to the backing surface more firmly than if said primer were omitted and said adhesive sheet being removable from smooth surfaces to which temporarily applied without delamination or offsetting of adhesive.

4. A pressure-sensitive adhesive sheet comprising a non-fibrous transparent flexible film backing having non-porous surfaces, a water-insoluble normally tacky and pressure-sensitive flexible adhesive coating, and an interposed highly cohesive flexible primer coating primarily composed of plasticized partially vulcanized rubber blended with an admixed compatible solid resin predominating the rubber and adapted to plasticize the rubber and increase its bonding strength, the adhesive coating being bonded to the backing more firmly than if said primer were omitted and the parts of the composite adhesive being so firmly united that the adhesive sheet may be unwound from rolls without delamination or offsetting of adhesive.

5. A pressure-sensitive adhesive sheet comprising a non-fibrous flexible film backing having non-porous surfaces, a water-insoluble normally tacky and pressure-sensitive flexible adhesive coating, and an interposed highly cohesive flexible primer coating primarily composed of masticated reclaim rubber blended with an admixed compatible solid resin predominating the rubber and adapted to plasticize the rubber and increase its bonding strength, the adhesive coating being bonded to the backing more firmly than if said primer were omitted and the adhesive and backing being of such kinds that the back surface of the backing is inactive to the adhesive coating to a degree permitting unwinding of the adhesive sheet from rolls thereof without delamination or offsetting of adhesive, said adhesive sheet transmitting light so that the sheet will not conceal the coloring or markings of surfaces to which applied.

6. A transparent pressure-sensitive adhesive sheet comprising a non-fibrous transparent regenerated cellulose film backing, a water-insoluble transparent adhesive coating having a rubbery base and so composed that it is non-offsetting and normally tacky and pressure-sensitive, and an interposed transparent highly cohesive and flexible primer coating primarily composed of plasticized partially vulcanized rubber blended with an admixed compatible solid resin predominating the rubber and adapted to plasticize the rubber and increase its bonding strength, the adhesive coating being bonded to the backing more firmly than if said primer were omitted and the parts of the composite adhesive sheet being so firmly united together that the adhesive sheet may be unwound from rolls thereof without delamination or offsetting of adhesive.

7. A transparent pressure-sensitive adhesive sheet comprising a non-fibrous transparent regenerated cellulose film backing, a water-insoluble transparent normally tacky and pressure-sensitive non-offsetting rubber-resin type adhesive coating, and an interposed transparent flexible highly cohesive primer coating primarily composed of reclaim rubber plasticized by mechanical working in the presence of air and heat and blended with rosin predominating the rubber, the adhesive coating being bonded to the backing more firmly than if said primer were omitted.

8. A pressure-sensitive adhesive sheet comprising a non-fibrous flexible cellulosic film backing having non-porous surfaces, a water-insoluble non-offsetting normally tacky and pressure-sensitive adhesive coating, and an interposed highly cohesive flexible primer coating primarily composed of about 90 parts plasticized reclaim rubber, 10 parts latex crepe, 40 parts whiting and 140 parts wood rosin.

RICHARD GURLEY DREW.